(No Model.) 2 Sheets—Sheet 2.
D. H. GOULD.
FRUIT PICKER.
No. 564,881. Patented July 28, 1896.
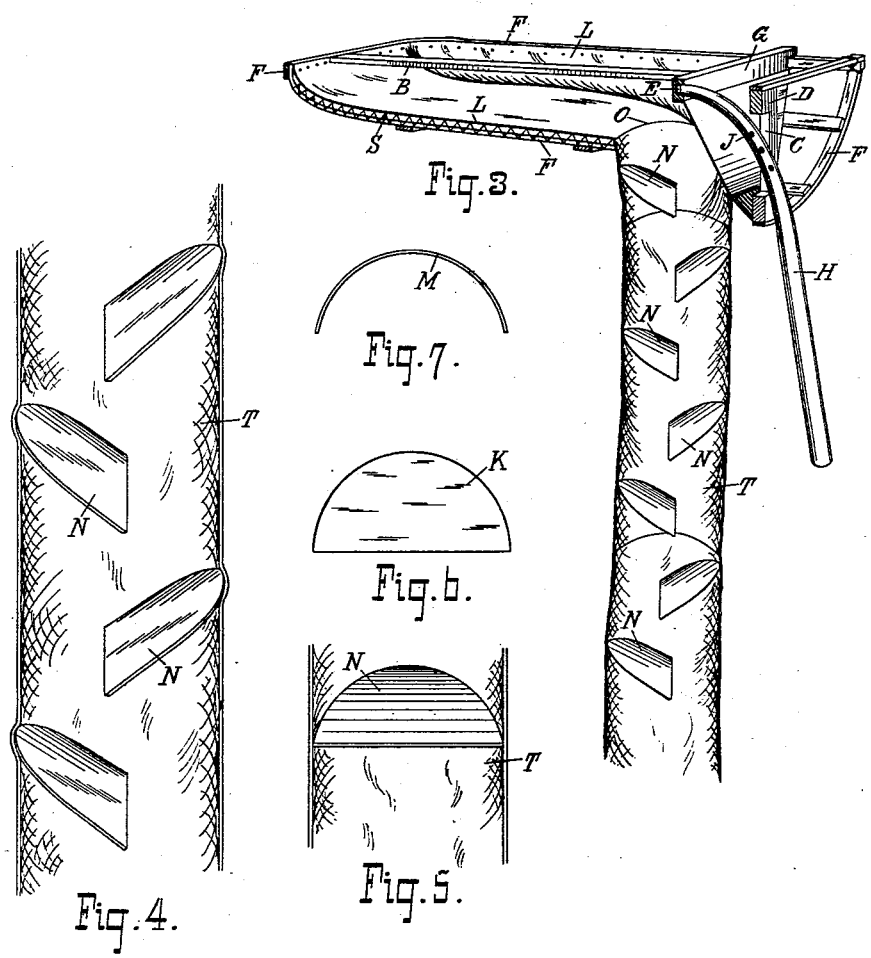
Witnesses
Jas. Edmunds
S. McBain
Inventor
Duncan H. Gould
By P. J. Edmunds
Attorney.

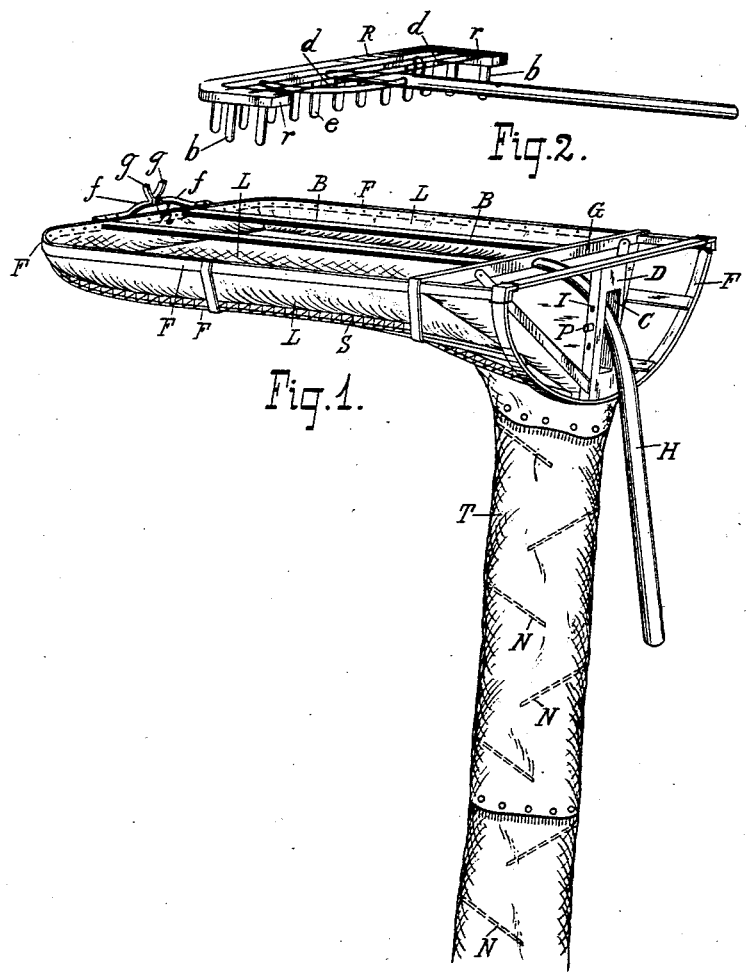

UNITED STATES PATENT OFFICE.

DUNCAN H. GOULD, OF EAST ZORRA, CANADA.

FRUIT-PICKER.

SPECIFICATION forming part of Letters Patent No. 564,881, dated July 28, 1896.

Application filed September 24, 1894. Serial No. 523,998. (No model.) Patented in Canada March 9, 1895, No. 48,396.

*To all whom it may concern:*

Be it known that I, DUNCAN H. GOULD, a subject of the Queen of Great Britain, and a resident of the township of East Zorra, in the county of Oxford, in the Province of Ontario, Canada, have invented certain new and useful Improvements in Fruit-Pickers, (for which I have obtained Letters Patent of the Dominion of Canada, No. 48,396, bearing date March 9, 1895,) of which the following specification, taken in connection with the accompanying drawings, forms a full, clear, and exact description.

This invention relates to an apparatus for reaching to and picking or detaching the fruit from the branch, and then conveying and delivering it on the ground or in a barrel or other suitable receptacle without being bruised or otherwise injured; and it consists of the improved construction and combination of parts of the same, as will be hereinafter first fully set forth and described, and then pointed out in the claims.

Reference is had to the accompanying drawings, wherein—

Figure 1 is a perspective view of an apparatus embodying my invention. Fig. 2 is a perspective view of the rake-detaching device which is used in connection with Fig. 1. Fig. 3 is a central longitudinal sectional view of the dish-shaped receiving-frame shown in Fig. 1. In this view one side of the flexible tube is removed in order to illustrate the zigzag partitions more clearly. Fig. 4 is an enlarged detail side view of a portion of the flexible tube, showing one side of the tube removed. Fig. 5 is another side view of a smaller portion of said tube, showing one side removed and looking at the partition at right angles to the position shown in Fig. 4. Figs. 6 and 7 are details of the frame forming the zigzag partitions or divisions in the flexible tube.

F designates a dish-shaped receiving-frame which may be made of any suitable size or shape, and of wood or other suitable material.

L designates a flexible lining, made of cotton, canvas, or other suitable material, with which the frame F is provided. The edges of said lining are secured around the upper edges of said frame, and the area or body of this lining L is less than the area of the inside surface of the frame F, so that when said lining is held suspended evenly, clear above and free from said frame by the stay-laces S, extending from the frame to said lining, the latter is suspended and held above and clear from the frame F, and provides a soft flexible yielding surface, which completely prevents the fruit from being bruised or otherwise injured when falling or thrown therein, and this lining L is formed with an opening O near one end, which communicates with and permits the fruit to pass from the lining L into the flexible tube T, and to further assist in conducting the fruit to said tube T the lining is preferably inclined toward said tube. This dish-shaped receiving-frame F is preferably supported on the upper end of a suitably-shaped handle H, but it may be secured to any support in any manner, or by any suitable means, and the fruit thrown or placed therein. When, however, the frame F is supported by the handle H, the upper end of this handle, which is preferably curved, as shown in Figs. 1 and 3, is projected through the opening C in the portion D and the end inserted in the socket E of the portion G of said frame F and pinned therein, as hereinafter described, for the purpose of firmly securing the handle H and frame F together.

I I designate pin-holes in the portion D of the frame F, and J pin-holes in the handle H, through any of which the pin P may be projected, by means of which the angle of the frame F may be changed in relation to the handle H, and at the same time firmly secure the handle and frame together.

B B designate two longitudinal bars extending across the frame F, as shown in Fig. 1, but two or more bars may be used if desired; and R designates a rake formed with the side teeth *b* in addition to the front teeth *e*, which teeth are preferably padded or covered with any suitable material to prevent them from injuring the fruit when pulling or detaching it from the branches; and this rake is also provided with the upper strips *d*, formed of spring-wire or other suitable material, which strips *d*, with the side teeth *b*, prevent the fruit from flying upward or off sidewise, and the strips *d* also brace the wings or rearward extensions *r* of the rake-head R.

The flexible tube T is made of cotton, canvas, or other suitable material, and is provided with zigzag divisions or partitions N, which extend over about one-half of the area or diameter of said tube T; and these flexible tubes T may be made of any suitable size or shape and of any convenient lengths desired, and secured to one another by any suitable means to provide a conveyer of any length required for the purpose of delivering the fruit at or on the ground. In the annexed drawings this flexible tube T is shown secured to the lining L of the frame F, but this flexible tube T may be detached therefrom and held at any elevation in any manner or by any means and the fruit placed or thrown therein. The divisions or partitions N in this tube T may be made of any size or shape and of any suitable material and placed in any position or angle and at any suitable distance apart in said tube T; and these divisions are preferably formed by stretching a semicircular sheet of cotton, canvas, or other suitable material K on and securing it to a semicircular hoop M, of spring-steel or other suitable material, and then securing the latter to the flexible tube T in the position shown in the accompanying drawings. This construction forms a partition or division N, having a flexible yielding drum-like tension, the attachment of which to the tube T holds the latter open to permit the fruit to pass freely through to be delivered at or on the ground without being bruised or otherwise injured.

The handle H, as well as the handle of the rake R, may be made in one or more sections and suitably secured together to increase or reduce the length of either as required.

While I prefer the construction shown, I do not limit myself to the details thereof, as they may be modified in various ways without departing from the spirit of my invention.

The operation is as follows: The operator grasps the handle of the rake R in one hand and the handle H in the other and adjusts the frame F, secured to said handle H, underneath and adjacent to the branch from which the fruit is hanging, and the rake R is adjusted above said branch. When adjusted as described, the fruit rests on the bars B B. The rake R is then engaged with the branch and drawn lengthwise of and along on the bars B B. This rapidly and completely strips off all the fruit, which falls into the receiving-frame F, from which it passes to the tube T, and by means of the divisions or partitions N the fruit falls from one partition onto the other and is thus delivered by short stages to the ground without being bruised or otherwise injured; and to prevent the action of the rake when detaching the fruit from shaking or jarring the adjacent or other branches I provide the frame F with an automatic grip $f g$, consisting of the spring portions $f$, each of which is secured at one end to the frame F and pivoted together at $h$, and each provided with an upturned end or jaw $g$. When the frame F is adjusted under the branch, as before described, the branch is adjusted to rest between the jaws $g g$. When in this position, the compression of the rake on the branch acts on the spring-arms $f$ to bring them horizontal on the frame F and close the jaws $g$ on the branch to hold it firmly when detaching the fruit, and thereby avoid and prevent the jarring or shaking of the other or adjacent branches. As soon as the pressure is removed from the branch or the frame F lowered from the under side thereof, the spring portions $f$ automatically open the jaws $g$ in position to receive the next branch, so that by means of this apparatus the operator, standing on the ground or at any elevation, can pick or detach the fruit and convey or deliver it to the ground, and all possibility of its being bruised or otherwise injured by the operation is avoided and completely prevented.

Having thus described my invention, I claim—

1. A dish-shaped receiving-frame, F, provided with the flexible lining, L, and the longitudinal bars, B, B, in combination with the rake, R, substantially as shown and described, and for the purpose specified.

2. A dish-shaped receiving-frame, F, having the portions, D, and, G, provided with the opening, C, and socket, E, respectively, and the portion, D, with the pinholes, I, and the pin, P, in combination with the handle, H, formed with the pinholes, J, substantially as shown and described, and for the purpose specified.

3. A dish-shaped receiving-frame, F, having the portions, D, and, G, provided with the opening, C, and socket, E, respectively, and the portion, D, provided with the pinholes, I, the pin, P, the lining, L, and the longitudinal bars, B, B, in combination with the rake, R, substantially as shown and described, and for the purpose specified.

4. A dish-shaped receiving-frame, F, provided with a yielding lining, L, and with the longitudinal bars, B, B, and the flexible tube, T, provided with the zigzag partitions, N, in combination with a rake, R, substantially as shown and described, and for the purpose specified.

5. A dish-shaped receiving-frame, F, provided with the grip, $f, g$, with a yielding lining, L, and with the longitudinal bars, B, B, and the flexible tube, T, provided with the zigzag partitions, N, in combination with a rake, R, substantially as shown and described, and for the purpose specified.

In testimony whereof I have signed in the presence of the two undersigned witnesses.

DUNCAN H. GOULD.

Witnesses:
P. J. EDMUNDS,
S. McBAIN.